United States Patent
Foong et al.

(10) Patent No.: US 7,160,450 B2
(45) Date of Patent: Jan. 9, 2007

(54) METHOD FOR REMOVING OIL, FAT AND GREASE FROM WATER

(75) Inventors: Weng Chuen Foong, Perak (MY); Paul Woodley, Perak (MY)

(73) Assignee: World Max Alliance Limited (VG)

( * ) Notice: Subject to any disclaimer, the term of this patent is extended or adjusted under 35 U.S.C. 154(b) by 431 days.

(21) Appl. No.: 10/479,174

(22) PCT Filed: May 30, 2002

(86) PCT No.: PCT/AU02/00689

§ 371 (c)(1),
(2), (4) Date: Apr. 26, 2004

(87) PCT Pub. No.: WO02/096812

PCT Pub. Date: Dec. 5, 2002

(65) Prior Publication Data

US 2005/0258089 A1    Nov. 24, 2005

(30) Foreign Application Priority Data

May 31, 2001   (AU) ................................ PR 5365

(51) Int. Cl.
  *C02F 1/24* (2006.01)
(52) U.S. Cl. .................................. 210/221.2; 210/194
(58) Field of Classification Search ............. 210/221.2, 210/221.1, 194
  See application file for complete search history.

(56) References Cited

U.S. PATENT DOCUMENTS 1,432,766 A  * 10/1922 Linden ........................ 209/210
3,505,188 A  *  4/1970 Pei-Tai ........................ 205/757

FOREIGN PATENT DOCUMENTS

| DE | 84 19 225 | 12/1984 |
|---|---|---|
| DE | 90 06 098 | 8/1990 |
| EP | 134061 | 3/1985 |
| EP | 0 445 576 | 9/1991 |
| GB | 124 551 | 3/1919 |
| SU | 1121236 | 10/1984 |
| SU | 1500626 | 8/1989 |

* cited by examiner

*Primary Examiner*—Thomas M. Lithgow
(74) *Attorney, Agent, or Firm*—Skinner and Associates

(57) ABSTRACT

Free oil, fat and grease contaminate water and wastewater these contaminants can be removed by an efficient separator system and allow the contaminants to be recovered at their maximum concentration.

6 Claims, 1 Drawing Sheet

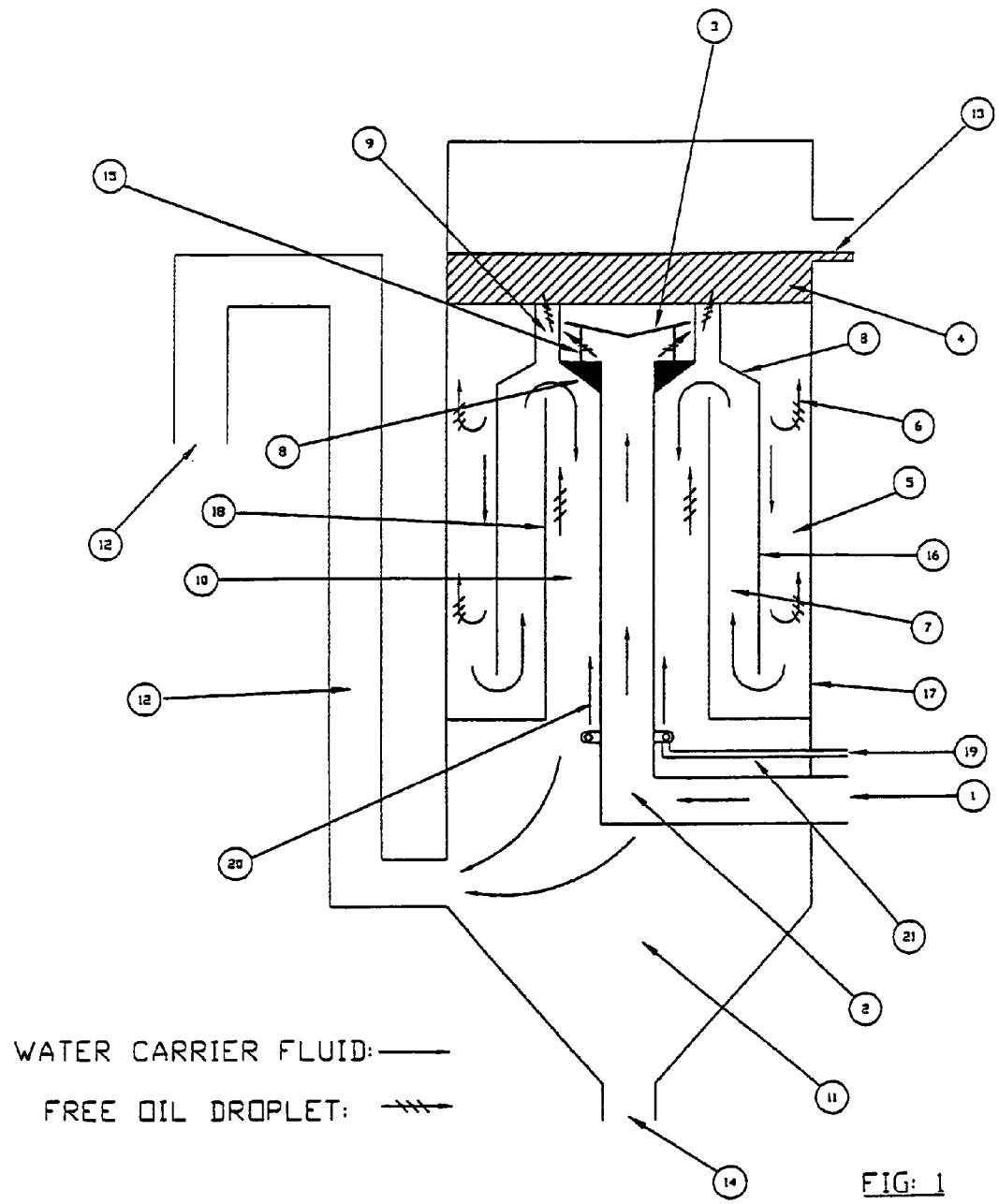
WATER CARRIER FLUID: ———
FREE OIL DROPLET: ⇸
FIG: 1

METHOD FOR REMOVING OIL, FAT AND GREASE FROM WATER

FIELD OF THE INVENTION

The invention relates to a method of removing free oil, fat and grease from a continuous flow of water or similar liquid. The system allows the free oil, fat and grease to be separated in an efficient manner within a chamber. The separated free oil, fat and grease is then removed in concentrated form from the top of the chamber whilst water with significantly reduced free oil, fat and grease is allowed to exit from the bottom of the chamber via an external level control device.

BACKGROUND OF THE INVENTION

Most industries face significant problems with processing and disposal of liquid waste that is contaminated with free oil, fat and grease. This type of waste poses a major threat to the global environment and there is a need for a simple and cost effective solution to remove these contaminants to allow clean water discharge to public sewers, waste treatment plants, inland waterways and seas or oceans.

BRIEF DISCUSSION OF THE INVENTION

The invention relates to a vertical cylindrical vessel into which are placed a series of cylinders some with end plates and some without that form a series of vertical annulus flow areas. This arrangement allows the liquid which is contaminated with free oil, fat and grease to flow in upwards or downwards directions through the annulus areas. This flow which takes place at ultra low velocity allows the free oil, fat and grease to coalesce and rise vertically and separate out until a free oil, fat and grease layer is formed at the top of the vertical cylinder where it can be removed via an overflow outlet. The water phase which has now been de-contaminated is allowed to discharge from the bottom outlet of the cylindrical vessel. An external level control device is fitted to enable variable control of the water/free oil, fat and grease levels within the vertical cylindrical vessel.

DETAILED DESCRIPTION OF THE INVENTION

REFER DRAWING FIG: 1

A liquid such as water which is contaminated by free oil, fat or grease is supplied to the counter-flow separator by a non-emulsifying pump at inlet (1), the oily water rises through a centrally located inlet pipe (2) which is sized to suit the required flow rate. The oily water on reaching the outlet point of the vertical riser pipe separates into two streams. One of these streams is of large oil droplets that impinge on the baffle plate (3) which is of an invert cone shape and is supported by one or more pillars to the top section of sleeve (16).

The large oil droplets which have a specific gravity less than that of the water carrier fluid coalesces on the underside of the inverted cone (3) and rise to float on the surface of the carrier fluid, in this case water, to form an oil layer at (4) free oil zone. At the same time, the carrier fluid water which also contains finer oil droplets of varying size is made to move in a downward direction through the annulus chamber created by the outer body (17) and inner sleeve (16).

The velocity of this downward movement between outer body (17) and sleeve (16) is such that remaining larger oil droplets being of a lighter specific gravity than the carrier fluid water coalesce together and invert and begin to move up against the downward flow of the carrier fluid water. Thus further separation takes place in chamber (5).

The larger oil droplets that have coalesced together and are rising eventually merge with the previously separated oil at free oil zone (4).

Carrier fluid water with finer oil droplets that are being carried in a downward direction reach the bottom of the annulus chamber (5) and are turned in an upward direction into annulus chamber (7) between sleeve (16) and sleeve (18). Here the finer oil droplets are rising with the carrier fluid water and these finer oil droplets coalesce on their vertical movement through annulus area (7) to form larger oil droplets. These larger oil droplets impinge on baffle plate (8) at the top of annulus chamber (7) and due to the difference in specific gravity between the oil and the carrier fluid water, small coalesced oil droplets rise vertically through one or more outlet pipes (9) and up into the oil collection area free oil zone (4).

Carrier fluid water which is now more or less oil free moves into annulus area (10) between sleeve (18) and the outside of the inlet pipe (2) and moves in a downward direction.

A small quantity of air (20) is introduced via a connection (19) and a sparge pipe (21) at the bottom of annulus area (10). This air rises and adheres to any fine oil droplets that may be carried in a downward direction through annulus area (10) and separates any remaining very fine oil droplets from the carrier fluid water.

The fine oil droplets are carried by the air vertically to the top of annulus (10) where the oil coalesces with larger oil droplets on impingement plate (8). The air and coalesced oil droplets rise through one or more pipes (9) into the oil collection zone free oil zone (4).

Carrier fluid water which is more or less free of oil and is exiting from annulus chamber (10) moves downwards into exit chamber (11) and on through the outlet pipe (12). This pipe can be adjusted in a vertical movement up or down to permit the level of free oil in zone (4) to be maintained until such time as the level of free oil rises on top of the carrier fluid water to allow the free oil to exit at the oil outlet connection (13).

Provision is made to allow any solid material that may accumulate in the outlet chamber (11) to be removed through outlet (14).

The invention claimed is:

1. A continuous flow separator for removing oil, fat, grease and the like from waste water comprising:
   a vertical cylindrical vessel having
   a centrally located waste water inlet at its base,
   a vertical riser pipe located centrally within the vessel and in fluid communication with the inlet and having an opening at its top,
   a first baffle plate located within the vessel and above the riser pipe,
   a first oil outlet pipe removing oil from the free oil zone,
   a free oil zone located between the top of the riser pipe and the oil outlet pipe;
   a first annulus chamber formed between the riser tube and a first sleeve surrounding the riser tube in fluid communication with the free oil zone,
   a second annulus chamber formed between a second sleeve surrounding the first sleeve, the top of said second annulus chamber being in fluid communication with the top of the first annulus chamber,
   a third annulus chamber formed between the second sleeve and an outer wall of the cylindrical vessel, the bottom of said third annulus chamber being in fluid communication with the second annulus chamber, a second baffle plate located above the first and second sleeves and separating the first and second annulus chambers from the free oil zone, at least one second oil outlet pipe for removing oil from the top of the first and second annulus chambers, an air inlet connected to a sparge pipe located at the bottom of the first annulus chamber, and a waste water outlet chamber having a waste water outlet pipe located below the bottom of the first annulus chamber.

2. A continuous flow separator as defined in claim 1 further comprising a pump to supply waste water to the waste water inlet.

3. A continuous flow separator as defined in claim 2 wherein said pump is a non-emulsifying pump.

4. A continuous flow separator as defined in claim 1 wherein said first baffle plate has an inverted cone shape.

5. A continuous flow separator as defined in claim 1 wherein said waste water outlet pipe can be adjusted in a vertical direction to control the level of liquid within the vessel.

6. A continuous flow separator as defined in claim 1 wherein the outlet chamber has a solid waste outlet to permit the removal of solids which may accumulate in the outlet chamber.

* * * * *